United States Patent
Magaletta (10) Patent No.: US 11,425,922 B2
(45) Date of Patent: Aug. 30, 2022

(54) METHODS AND SYSTEMS FOR REDUCING ACRYLAMIDE CONCENTRATION IN HEAT-PROCESSED PRODUCTS

(71) Applicant: Intercontinental Great Brands LLC, East Hanover, NJ (US)

(72) Inventor: Robert L. Magaletta, East Hanover, NJ (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 199 days.

(21) Appl. No.: 16/687,448

(22) Filed: Nov. 18, 2019

(65) Prior Publication Data

US 2021/0145030 A1    May 20, 2021

(51) Int. Cl.
  *A23L 5/20*    (2016.01)
  *A23L 5/30*    (2016.01)
  (Continued)

(52) U.S. Cl.
  CPC ............... *A23L 5/27* (2016.08); *A21D 15/06* (2013.01); *A23L 3/28* (2013.01); *A23L 5/30* (2016.08);
  (Continued)

(58) Field of Classification Search
  CPC ..... A23L 5/27; A23L 5/32; A23L 5/20; A23L 3/28; A23L 3/40; A23L 5/30;
  (Continued)

(56) References Cited

U.S. PATENT DOCUMENTS

| 2,186,401 | A | * | 1/1940 | Bart | A21D 15/00 |
| | | | | | 250/453.11 |
| 3,549,366 | A | * | 12/1970 | Margerum | G03F 7/027 |
| | | | | | 430/283.1 |

(Continued)

FOREIGN PATENT DOCUMENTS

| CN | 104543317 A | * | 4/2015 |
| EP | 2180316 | | 4/2010 |

(Continued)

OTHER PUBLICATIONS

Fried Ice Cream NPL, https://overtimecook.com/2013/11/25/fried-ice-cream/, 2013 (Year: 2013).*

(Continued)

*Primary Examiner* — Drew E Becker
(74) *Attorney, Agent, or Firm* — Fitch, Even, Tabin & Flannery LLP (57) ABSTRACT

Methods and systems for reducing acrylamide concentration in heat-processed products, and products produced by such methods and systems are provided. The baked products may be sprayed with a riboflavin solution and then irradiated with a UV light source to initiate monomer reactions of acrylamide and reduce the concentration of the acrylamide in the baked product. In addition, riboflavin may be dissolved in heat-processed products, followed by irradiation of the riboflavin-containing heat-processed products with a UV light source to initiate monomer reactions of acrylamide and reduce the concentration of the acrylamide in the baked product.

6 Claims, 5 Drawing Sheets

(51) Int. Cl.
  *A21D 15/06* (2006.01)
  *A23L 3/28* (2006.01)
(52) U.S. Cl.
  CPC ............ *A23L 5/32* (2016.08); *A23V 2002/00* (2013.01); *A23V 2200/308* (2013.01); *A23V 2250/7044* (2013.01); *A23V 2300/10* (2013.01)
(58) Field of Classification Search
  CPC .... A21D 15/06; A21D 6/005; A23V 2002/00; A23V 2200/308; A23V 2250/7044; A23V 2300/10; A23V 2300/24; A47J 37/044
  See application file for complete search history.

(56) References Cited

U.S. PATENT DOCUMENTS

| | | | |
|---|---|---|---|
| 5,552,501 A * | 9/1996 | Patel | C08F 220/54 526/217 |
| 6,803,064 B1 | 10/2004 | Given | |
| 7,264,838 B2 | 9/2007 | Plank | |
| 7,335,386 B2 | 2/2008 | Plank | |
| 8,133,527 B2 | 3/2012 | Haynes | |
| 8,158,175 B2 | 4/2012 | Bourg, Jr. | |
| 8,173,193 B2 | 5/2012 | Haynes | |
| 9,353,173 B2 | 5/2016 | Chhun | |
| 9,839,231 B2 | 12/2017 | Ashourian | |
| 2002/0015662 A1 | 2/2002 | Hlavinka | |
| 2003/0141260 A1 | 7/2003 | Corbin | |
| 2006/0029707 A1 | 2/2006 | Plank | |
| 2008/0033070 A1 | 2/2008 | Naylor | |
| 2010/0009040 A1 * | 1/2010 | Kamper | A23L 7/135 426/104 |
| 2010/0310712 A1 * | 12/2010 | Ashourian | A23L 19/00 426/243 |
| 2011/0014321 A1 * | 1/2011 | Hellaby | A21D 15/06 426/549 |
| 2013/0017311 A1 * | 1/2013 | Nolasco | A23G 3/368 426/660 |
| 2013/0034628 A1 * | 2/2013 | Fagan | A23L 5/25 426/48 |
| 2013/0108555 A1 | 5/2013 | Lary, Jr. | |
| 2013/0236601 A1 * | 9/2013 | Collins | A21D 13/60 426/659 |
| 2016/0088853 A1 * | 3/2016 | Tikekar | A23L 3/3463 426/305 |
| 2016/0242448 A1 * | 8/2016 | Ludescher | A61K 9/2072 |

FOREIGN PATENT DOCUMENTS

| | | |
|---|---|---|
| WO | 2004098313 | 11/2004 |
| WO | 2015009143 | 1/2015 |

OTHER PUBLICATIONS

International Search Report and Written Opinion of the International Search Authority, dated Feb. 16, 2021, International Application No. PCT/US2020/058793 (11 pgs.).

* cited by examiner

METHODS AND SYSTEMS FOR REDUCING ACRYLAMIDE CONCENTRATION IN HEAT-PROCESSED PRODUCTS

FIELD

The present disclosure generally relates to reducing acrylamide concentration in heat-processed products, and more particularly to using riboflavin in combination with UV irradiation to reduce acrylamide concentration in heat-processed products.

BACKGROUND

Acrylamide is a chemical that can form in some foods during high-temperature cooking processes, such as frying, roasting, and baking, via non-enzymatic browning reactions between reducing sugars and the amino acid asparagine. Various methods have been developed to reduce the levels of acrylamide formed in high-temperature cooking processes. Such methods include treatment of raw materials with asparaginase enzyme to reduce the amount of asparagine present, adjustment of production procedures to minimize formation of acrylamide, selection of plant varieties to minimize the reducing sugar and asparagine contents, addition of competing amino acids or acidic compounds and ingredient pretreatments such as washing or soaking to remove the reactants. However, such methods typically do not completely prevent formation of acrylamide, and it would be desirable to effectively reduce acrylamide concentrations in heat-processed products.

SUMMARY

Generally, methods of using riboflavin as a non-toxic photo-initiator to initiate monomer reactions of acrylamide in the presence of ultraviolet (UV) light are described herein. As pointed out above, it is known to use riboflavin as a non-toxic photo-initiator to produce polyacrylamide gels (which are used to perform electrophoresis analysis) from acrylamide monomer in the presence of UV light. However, the methods described herein take advantage of riboflavin's ability to act as a photo-initiator and apply this ability to food product preparation and/or treatment in order to reduce acrylamide content in heat-processed consumable foods.

Riboflavin is a water-soluble vitamin that is naturally present in some foods, added to some foods, and available as a dietary supplement. This vitamin is an essential component of two major coenzymes, flavin mononucleotide (FMN; also known as riboflavin-5'-phosphate) and flavin adenine dinucleotide (FAD). These coenzymes play major roles in energy production, cellular function, growth, and development, as well as metabolism of fats, drugs, and steroids.

Foods that are particularly rich in riboflavin include eggs, organ meats (kidneys and liver), lean meats, and milk. Green vegetables also contain riboflavin. Grains and cereals are fortified with riboflavin in the United States and many other countries. The largest dietary contributors of total riboflavin intake by consumers in the United States are milk and milk drinks, bread and bread products, mixed foods whose main ingredient is meat, ready-to-eat cereals, and mixed foods whose main ingredient is grain.

Riboflavin consumed orally has no reported toxicity. Reports of adverse effects all relate to animal studies or cell culture research involving either drugs with phototoxicity, intense exposure of lens tissue to ultraviolet light, or both in combination with high levels of riboflavin. There are no reports of adverse reactions that can be attributed to riboflavin consumed orally from foods or dietary supplements.

Riboflavin has been shown to be capable of acting as a polymerization photo-initiator, forming a free radical upon exposure to light, and then transferring that free radical to monomeric species that then polymerize into oligomers and polymers, which led to uses of riboflavin as a non-toxic photo-initiator to produce polyacrylamide gels (which are used to run electrophoresis analysis) from acrylamide monomer in the presence of UV light.

Riboflavin has been shown to strongly absorb light of particular wavelengths. For example, an aqueous solution containing 0.08 mg/mL or 80 ppm riboflavin measured in a quartz cuvette with a path length of 0.5 mm is generally characterized by having a maximum of absorbance in the UV range (222 nm, 266 nm, 373 nm) and in the visible light range (445 nm). It has also been observed that light corresponding to the regions of more intense absorption will be more effective in activating riboflavin as a photo-initiator.

Described herein are methods of removing (i.e., reducing the concentration of) acrylamide from heat-processed food products by spraying the heat-processed products with a solution containing a water-soluble food-grade photo-initiator such as riboflavin, followed by irradiation with an intense source of UV light. Such methods take advantage of the fact that a large percentage of the acrylamide in a heat-processed food product is formed at or near the surface of the product, due to the higher temperatures and more intense browning reactions found at those surfaces during the heat-processing (e.g., baking, frying, or the like).

According to some embodiments, a method of reducing acrylamide concentration in a heat-processed product includes spraying a riboflavin solution onto at least a portion of an exterior surface of the heat-processed product; and irradiating the riboflavin solution-sprayed heat-processed product with a UV light source to initiate monomer reactions of acrylamide and reduce the acrylamide concentration in the heat-processed product.

According to other embodiments, a method of reducing acrylamide concentration in a heat-processed product includes dissolving riboflavin in the heat-processed product and irradiating the heat-processed product having the riboflavin dissolved therein with a UV light source to initiate monomer reactions of acrylamide and reduce the concentration of the acrylamide in the heat-processed product.

According to yet other embodiments, a system for reducing acrylamide concentration in a heat-processed product includes a conveyor including a product advancement surface configured to move a heat-processed product in first direction; at least one nozzle positioned adjacent the product advancement surface and configured to spray a riboflavin solution onto at least a portion of an exterior surface of the heat-processed product during movement of the heat-processed product on the product advancement surface of the conveyor; and at least one UV light source positioned adjacent the product advancement surface and downstream of the at least one nozzle, at least one UV light source configured to irradiate at least a portion of the exterior surface of the heat-processed product during movement of the heat-processed product on the product advancement surface of the conveyor.

The riboflavin solution may be a solution of riboflavin dissolved in water, a solution of riboflavin dissolved in a solution containing water and ethanol, or the like. The riboflavin solution may contain from about 1 ppm to about 1000 ppm riboflavin. The riboflavin solution may be sprayed onto the exterior surface of the heat-processed product (e.g., biscuit, bread, or the like), or dissolved in a heat-processed product (e.g., molasses or the like) in an amount of about 1% to about 5% by weight of the heat-processed product.

The riboflavin solution-sprayed heat-processed product may be irradiated with a UV light source that provides wavelengths between 200 nm and 400 nm (for example, 254 nm, 365 nm, etc.). In certain aspects (for example, depending on the intensity of the UV light source), the heat-processed product may be irradiated with the UV light source for about 1 second to about 60 seconds. Preferably, the heat-processed product is irradiated with UV light in a manner that ensures that the UV light penetrates the entire thickness of the heat-processed product. The heat-processed product may be a product that is ready for consumption (e.g., a biscuit product, a bread product, crisps, chips, cookies, or the like), or may be a product that may be used as a raw ingredient to prepare other products (e.g., molasses or the like).

The present inventors unexpectedly discovered that spraying a riboflavin-containing solution onto an exterior surface of a heat-processed baked product, as well as dissolving riboflavin in a heat-processed product, followed by irradiation of the heat-processed product with a UV light source significantly reduces the concentration of acrylamide, which is known to be generated in the heat-processed product during the heat processing. The heat-processed products produced according to the methods and systems described herein have a reduced acrylamide concentration as compared to the heat-processed products that are not subjected to the presently described methods and systems, and make the heat-processed products produced by the methods and systems described herein significantly safer for consumers.

BRIEF DESCRIPTION OF THE DRAWINGS

Disclosed herein are embodiments of systems and methods pertaining to methods and systems for reducing acrylamide concentration in heat-processed products. This description includes drawings, wherein.

DETAILED DESCRIPTION

Methods and systems for reducing acrylamide concentration in heat-processed products, and products produced by such methods and systems, are described herein. The heat-processed products may be sprayed with a riboflavin or riboflavin-5'-phosphate solution and then irradiated with a UV light source to initiate monomer reactions of acrylamide and reduce the concentration of the acrylamide in the heat-processed product. Also, riboflavin or riboflavin-5'-phosphate may be dissolved in heat-processed products, followed by irradiation of the riboflavin-containing heat-processed products with a UV light source to initiate monomer reactions of acrylamide and reduce the concentration of the acrylamide in the heat-processed product.

Figure 1:
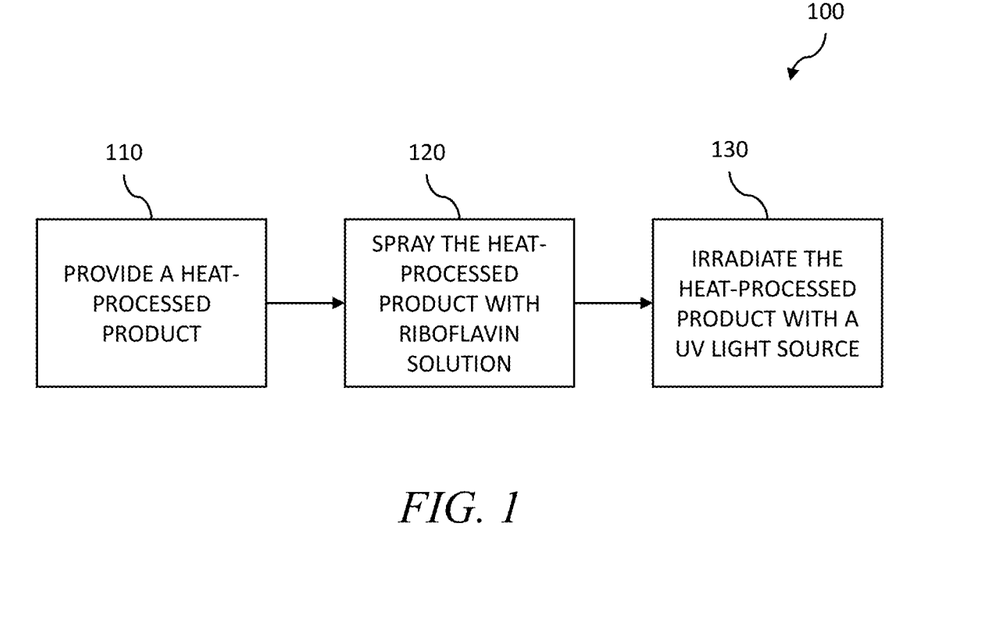
FIG. 1 is a process flow diagram of an exemplary method of treating a heat-processed product by spraying an exterior surface of the heat-processed product with a riboflavin solution, followed by UV light irradiation to reduce acrylamide concentration therein.

A process flow diagram of an exemplary method 100 of treating a heat-processed product to reduce the acrylamide concentration therein is depicted in FIG. 1. In certain aspects, the method 100 can be used to treat heat-processed products that are ready for consumption (e.g., biscuit products, a bread products, crisps, chips, or the like). The method 100 shown in FIG. 1 includes providing a heat-processed product (step 110), spraying a riboflavin solution onto at least a portion of the exterior surface of the heat-processed product (step 120); and irradiating the riboflavin solution-sprayed heat-processed product with a UV light source to initiate monomer reactions of acrylamide and reduce the acrylamide concentration in the heat-processed product (step 130).

Figure 3:
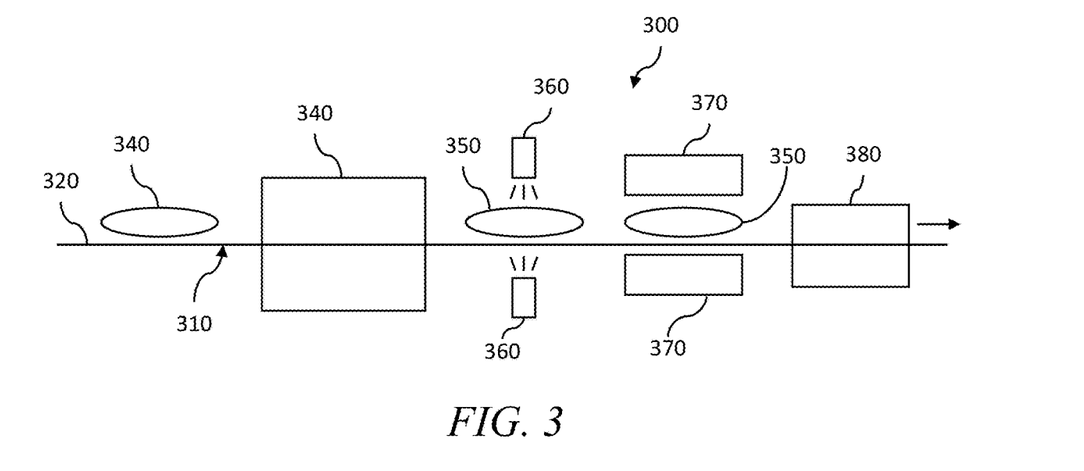
FIG. 3 is a diagram illustrating a system for treating a heat-processed product by spraying an exterior surface of the heat-processed product with a riboflavin solution, followed by UV light irradiation to reduce acrylamide concentration therein.

With reference to FIG. 3, an exemplary system 300 for reducing acrylamide concentration in a heat-processed product includes a conveyor 310 with a product advancement surface 320 for supporting and transporting raw ingredients 330 (i.e., precursors of heat-processed products 350) upstream of the heating source 340, as well as for supporting and transporting the heat-processed products 350 themselves downstream of the heating source 340. In some embodiments, the conveyor 310 is a chain link type conveyor belt such that portions of the heat-processed products 350 being moved by the conveyor 310 would be exposed to the UV light emitted by the UV light source 370 located below the conveyor 310. In some aspects, the heating source 340 is a baking oven that can bake the raw ingredients 330 in order to produce a heat-processed product 350 that is baked (e.g., biscuit, crisp, ginger snap, cookie, or the like).

In some embodiments, the system 300 includes spray nozzles 360 positioned adjacent the product advancement surface 320. In the embodiment illustrated in FIG. 3, the system 300 includes a first spray nozzle 360 positioned above the product advancement surface 320 and a second spray nozzle 360 positioned below the product advancement surface 320. As such, the first and second spray nozzles 360 are positioned in a way that they can spray a riboflavin-containing solution onto both an upward-facing and the downward-facing surface of the heat-processed product 350 moving on the product advancement surface 320. Of course, it will be appreciated that the system 300 is shown with two spray nozzles 360 by way of example only, and that more than two spray nozzles 360 (e.g., 3, 4, 5, 6, or more) or less than two spray nozzles 360 (e.g., one spray nozzle) may be used.

Figure 5:
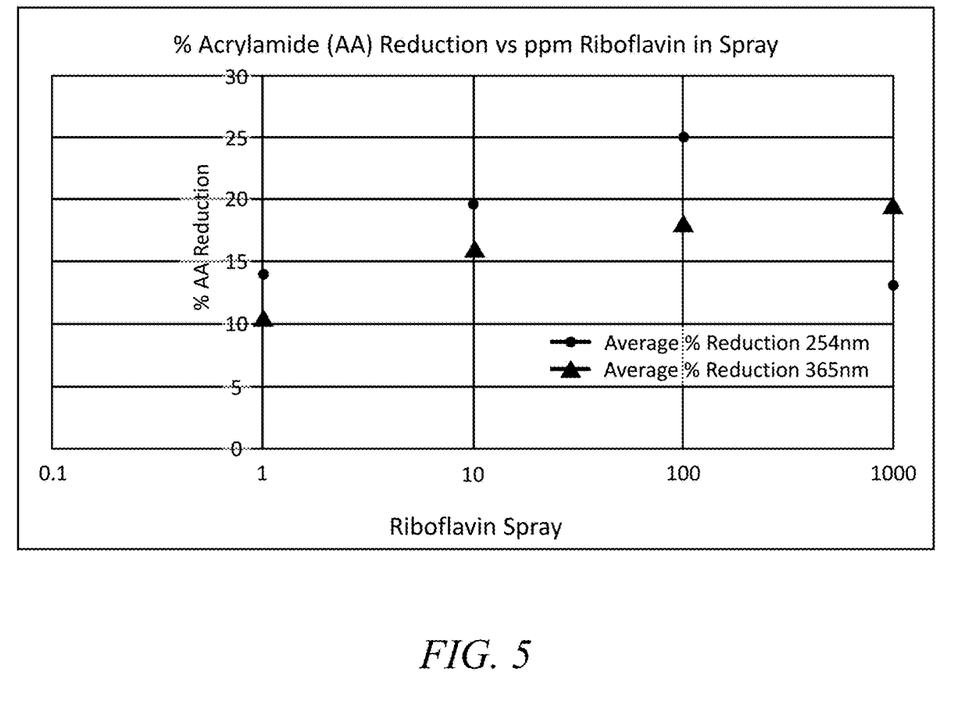
FIG. 5 is a chart representing percent acrylamide (AA) reduction at various riboflavin concentrations and light wavelengths.

As mentioned above, the riboflavin solution may be a solution of riboflavin or riboflavin-5'-phosphate dissolved in pure water, a solution of riboflavin or riboflavin-5'-phosphate dissolved in a solution containing water and food-safe organic solvent such as ethanol, or the like. Without wishing to be limited by theory, incorporation of an organic solvent may accelerate the drying process post-treatment and help to preserve the riboflavin solution against microbial growth. In various embodiments, the riboflavin solution contains from about 1 ppm to about 1000 ppm riboflavin or riboflavin-5'-phosphate. As shown in FIG. 5, it has been found that increasing the concentration of riboflavin in the riboflavin-containing solution increases the resulting reduction of acrylamide in the heat-processed product that has been sprayed by the riboflavin-containing solution and later irradiated with a UV light source. The concentration of riboflavin may be adjusted upward or downward from the target concentration (e.g., 100 ppm) in order to optimize the balance between organoleptic acceptability of the treated product and acrylamide reduction in the treated product.

With reference back to FIG. 3, in some aspects, the spray nozzles 360 are configured to spray the heat-processed product 350 that is moving on the product advancement surface 320 of the conveyor 310 such that the riboflavin-containing solution is applied to the exterior surface of the heat-processed product 350 in an amount of about 1% to about 5% by weight of the heat-processed product 350. For example, in some embodiments, where the heat-processed product is a baked belVita® biscuit that weighs 12.5 grams, the amount of riboflavin-containing solution that may be sprayed onto the exterior surface of the biscuit may be from about 0.1 g to about 0.7 g (in one aspect, from about 0.125 g to about 0.625 g, in another aspect, from about 0.2 g to about 0.5 g and in another aspect, from about 0.3 g to about 0.4 g).

The system 300 of FIG. 3 further includes UV light sources 370 positioned adjacent the product advancement surface 320 of the conveyor and downstream of the spray nozzles 360. As such, after the exterior surface heat-processed product 350 is sprayed with the riboflavin-containing solution by the spray nozzles 360, the UV light sources irradiate the exterior surface of the heat-processed product 350 during movement of the heat-processed product 350 on the product advancement surface 320 of the conveyor 310.

In the embodiment shown in FIG. 3, the system 300 includes two UV light sources 370, a first UV light source 370 positioned above the product advancement surface 320 and a second UV light source 370 positioned below the product advancement surface 320. As such, the first and second UV light sources 370 are positioned such that they can irradiate both the upward-facing and the downward-facing surface of the riboflavin solution-sprayed heat-processed product 350 that is moving on the product advancement surface 320. In some aspects, the UV light sources 370 may be configured as an irradiated tunnel containing a series of mercury lamps, Light Emitting Diodes (LEDs) or equivalent light sources capable of emitting UV light to initiate the reactions. In some aspects, forced air convection and heating may be added to the UV tunnel to achieve moisture reduction during or after the UV irradiation of the riboflavin-sprayed heat-processed products as they pass through the tunnel.

In some embodiments, each of the UV light sources 370 is positioned relative to the product advancement surface 320 of the conveyor 310 such that the lamp of each UV light source 370 is located approximately 2.5 inches from the exterior (e.g., upwardly-facing or downwardly-facing) surface of the heat-processed product 350. It will be appreciated that, in various embodiments, depending on the intensity of the UV light sources 370, the UV light sources 370 may be positioned such that the lamp is further than 2.5 inches from the exterior surface of the heat-processed product 350 (i.e., if the UV light sources 370 are medium to high intensity), or closer than 2.5 inches from the exterior surface of the heat-processed product 350 (i.e., if the UV light sources 370 are low to medium intensity). Generally, low lamp intensity may be considered to be 0-1000 $\mu W/cm^2$, medium lamp intensity may be considered to be 1000-4000 $\mu W/cm^2$, and high lamp intensity may be considered to be 4000-5000 $\mu W/cm^2$.

In some embodiments, the UV light source 370 is configured to provide wavelengths between 200 nm and 400 nm. In some aspects, the UV light source 370 is a mercury vapor lamp that is configured to provide wavelengths between 200 nm and 600 nm. In other aspects, the UV light source 370 is a variable wavelength UV lamp configured to provide three wavelengths, namely, 254 nm, 302 nm, and 365 nm. Yet in other aspects, the UV light source 370 is a high intensity, shortwave quartz grid lamp used together with a predetermined bandpass filter (e.g., a 254 nm filter, a 365 nm filter, or the like). It will be appreciated that the UV light sources are described by way of example only, and that other suitable UV light sources (e.g., light emitting diode (LED) lights) may be used as well.

With reference to FIG. 3, the product advancement surface 320 of the conveyor 310 is set (e.g., via a control unit coupled to the conveyor 310) to move the riboflavin solution-sprayed heat-processed product 350 at a speed that provides the riboflavin solution-sprayed heat-processed product 350 with irradiation by the UV light sources 370 for about 1 second to about 60 seconds. In various embodiments, if the UV light sources 370 are high intensity, the speed of the conveyor 310 and the amount of time the UV light sources 370 stay on to irradiate the heat-processed product 350 may be set such that the heat-processed product 350 is irradiated for about 1-15 seconds, if the UV light sources 370 are medium intensity, the speed of the conveyor 310 and the amount of time the UV light sources 370 stay on may be set such that the heat-processed product 350 is irradiated for about 15-45 seconds, and if the UV light sources 370 are low intensity, the speed of the conveyor 310 and the amount of time the UV light sources 370 stay on may be set such that the heat-processed product 350 is irradiated for 45-60 seconds. As mentioned above, low lamp intensity may be considered to be 0-1000 $\mu W/cm^2$, medium lamp intensity may be considered to be 1000-4000 $\mu W/cm^2$, and high lamp intensity may be considered to be 4000-5000 $\mu W/cm^2$.

In the illustrated embodiment, the system 300 includes a dryer 380 downstream of the UV light sources 370. The dryer 380 could be one dryer as shown in FIG. 3, or two dryers 380, with one being positioned above the conveyor 310 and one being positioned below the conveyor 310. A purpose of the dryer 380 is to reduce the moisture content that was added to the heat-processed product 350 as a result of the spraying of the riboflavin-containing solution by the spray nozzles 360, such that the heat-processed product 350 can be packaged while it is in a dry state. It will be appreciated that the dryer would be set to a temperature or a range of temperatures that would be below the threshold for acrylamide formation in the heat-processed product 350 as the heat-processed product passes through the dryer 380.

Figure 2:
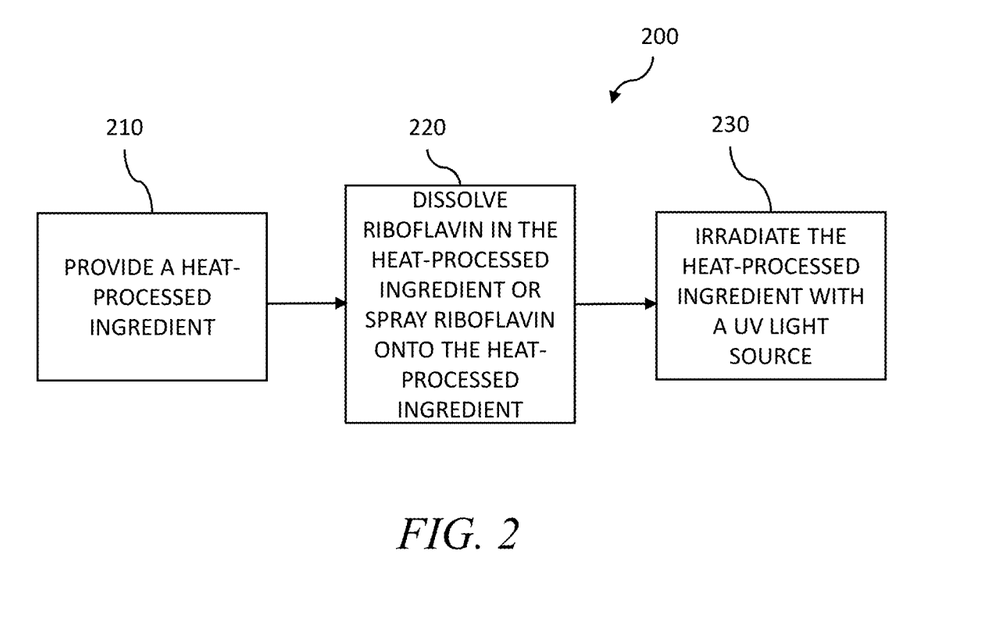
FIG. 2 is a process flow diagram of another exemplary method of treating a heat-processed product by dissolving riboflavin in the heat-processed product, followed by UV light irradiation to reduce acrylamide concentration therein.

A process flow diagram illustrating another exemplary method 200 of treating a heat-processed product to reduce the acrylamide concentration therein is depicted in FIG. 2. In certain aspects, the method 200 can be used to treat heat-processed products that are in a semi-liquid/semi-solid form, and which may be used as ingredients for making other products (e.g., molasses or the like). The method 200 illustrated in FIG. 2 includes providing a heat-processed ingredient (step 210), spraying a riboflavin solution onto at least a portion of the exterior surface of the heat-processed ingredient (step 220); and irradiating the riboflavin solution-sprayed heat-processed ingredient with a UV light source to initiate monomer reactions of acrylamide and reduce the acrylamide concentration in the heat-processed product (step 230).

Figure 4:
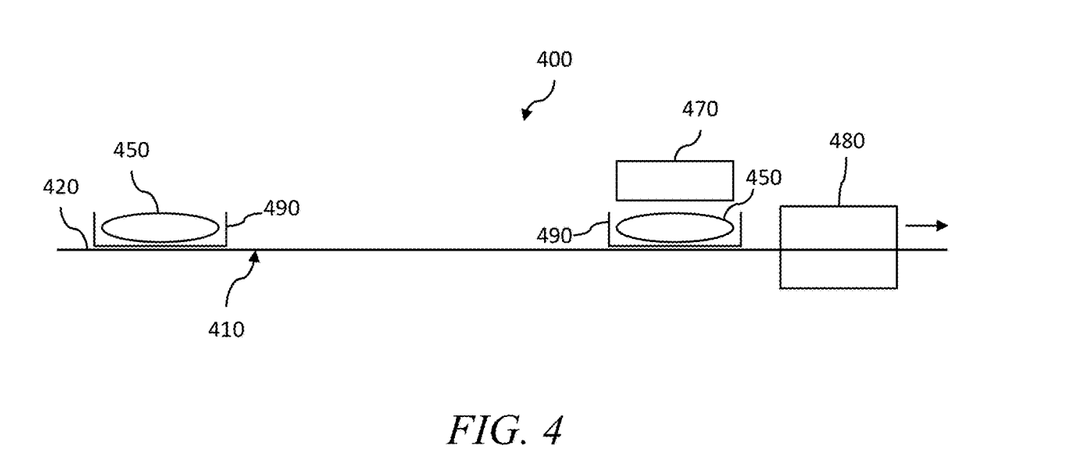
FIG. 4 is a diagram illustrating a system for treating a heat-processed product by dissolving riboflavin in the heat-processed product, followed by UV light irradiation to reduce acrylamide concentration therein.

With reference to FIG. 4, an exemplary system 400 for reducing acrylamide concentration in a heat-processed product includes a conveyor 410 including a product advancement surface 420 for supporting and transporting a heat-processed product 450 that has riboflavin dissolved therein. For example, in one aspect, the heat-processed product 450 is a semi-liquid/semi-solid/viscous product such as molasses to which riboflavin is added (for example, in the form of a solution where riboflavin is dissolved in water, a solution where riboflavin is dissolved in a solution of water and ethanol, or the like), and the riboflavin-containing product 450 (e.g., molasses) is stirred until the riboflavin is dissolved therein. As mentioned above, in various embodiments, the riboflavin solution contains from about 1 ppm to about 1000 ppm riboflavin and the riboflavin-containing solution is dissolved in the heat-processed product 450 in an amount of about 1% to about 5% by weight of the heat-processed product 450.

The system 400 of FIG. 4 further includes a UV light source 470 positioned adjacent the product advancement surface 420 of the conveyor 410. As such, the heat-processed product 450 having the riboflavin dissolved therein is irradiated by the UV light source 470 during movement of the heat-processed product 450 on the product advancement surface 420 of the conveyor 410. In the embodiment illustrated in FIG. 4, the system 400 includes one UV light source 470 positioned in a way that it irradiates the riboflavin solution-sprayed heat-processed product 450 moving on the product advancement surface 420 from above. Since the heat-processed product 450 is in a semi-liquid/semi-solid/viscous form, the inventors found that having one UV light source 470 positioned above the heat-processed product 450 sufficiently penetrates and irradiates the heat-processed product 450 with UV light throughout. It will be appreciated that the system 400 may also include two UV light sources 470 akin to the two UV light sources 370 of the system 300, namely, a first UV light source 470 positioned above the product advancement surface 420 and a second UV light source 470 positioned below the product advancement surface 420

In the embodiment shown in FIG. 4, the heat-processed product 450 is shown as being retained in a heating-safe container such as a tray 490 or the like, which includes a bottom wall 492 and sidewalls 494 extending upwardly therefrom. In one aspect, the bottom wall 492 of the tray 490 is formed of, or coated with a light reflective material (e.g., aluminum, etc.) that would reflect the UV light emitted onto the heat-processed product 450 from above by the UV light source 470, and facilitate dispersion of the UV light throughout the heat-processed product 450.

In some embodiments, the UV light source 470 is positioned relative to the product advancement surface 420 of the conveyor 410 such that the lamp of the UV light source 470 is located approximately 2.5 inches from the exterior (e.g., upwardly-facing) surface of the heat-processed product 450. Same as above, it will be appreciated that, in various embodiments, depending on the intensity of the UV light source 470, the UV light source 470 may be positioned such that the lamp is closer than 2.5 inches from the exterior surface of the heat-processed product 450 (i.e., if the UV light source 470 are medium to high intensity), or further away than 2.5 inches from the exterior surface of the heat-processed product 450 (i.e., if the UV light source 470 is low to medium intensity). As mentioned above, low lamp intensity may be considered to be 0-1000 $\mu W/cm^2$, medium lamp intensity may be considered to be 1000-4000 $\mu W/cm^2$, and high lamp intensity may be considered to be 4000-5000 $\mu W/cm^2$.

Like the UV light sources 370 of FIG. 3, the UV light source 470 of FIG. 4 is configured to provide wavelengths between 200 nm and 400 nm. In some aspects, the UV light source 470 is a mercury vapor lamp configured to provide wavelengths between 200 nm and 600 nm. In other aspects, the UV light source 470 is a variable wavelength UV lamp configured to provide three wavelengths, namely, 254 nm, 302 nm, and 365 nm. Yet in other aspects, the UV light source 470 is a high intensity, shortwave quartz grid lamp used together with a predetermined bandpass filter (e.g., a 254 nm filter, a 365 nm filter, or the like). It will be appreciated that other suitable UV light sources (e.g., LED lights) may be used as well.

With reference to FIG. 4, the product advancement surface 420 of the conveyor 410 is set (e.g., via a control unit coupled to the conveyor 410) to move the riboflavin solution-sprayed heat-processed product 450 at a speed that provides the riboflavin solution-sprayed heat-processed product 450 with irradiation by the UV light sources 470 for about 1 second to about 60 seconds. In various embodiments, if the UV light source 470 is high intensity, the speed of the conveyor 410 and the time the UV light source 470 irradiates the heat-processed product 450 may be set such that the heat-processed product 450 is irradiated for about 1-15 seconds. If the UV light source is 470 medium intensity, the speed of the conveyor 410 and the time the UV light source 470 irradiates the heat-processed product 450 may be set such that the heat-processed product 450 is irradiated for about 15-45 seconds. If the UV light source is 470 low intensity, the speed of the conveyor 410 and the time the UV light source 470 irradiates the heat-processed product 450 may be set such that the heat-processed product 450 is irradiated for 45-60 seconds.

As mentioned above, generally, low lamp intensity may be considered to be 0-1000 $\mu W/cm^2$, medium lamp intensity may be considered to be 1000-4000 $\mu W/cm^2$, and high lamp intensity may be considered to be 4000-5000 $\mu W/cm^2$. In the illustrated embodiment, the system 400 includes a dryer 480 downstream of the UV light source 470. A purpose of the dryer 480 is to reduce the moisture content that was added to the heat-processed product 450 as a result of dissolving the riboflavin-containing solution therein. As mentioned above, it will be appreciated that the dryer would be set to a temperature or a range of temperatures that would be below the threshold for forming acrylamide in the heat-processed product 450 as the heat-processed product passes through the dryer 480.

Advantages and embodiments of the methods and systems and products described herein are further illustrated by the following examples; however, the particular conditions, processing schemes, materials, and amounts thereof recited in these examples, as well as other conditions and details, should not be construed to unduly limit these methods and systems. All percentages recited herein are by weight unless specified otherwise.

The following examples illustrate reduction of acrylamide in heat-processed products according to exemplary methods described herein.

EXAMPLES

Example 1

An experiment (which was run in triplicate) was carried out, treating belVita® baked biscuits that were intentionally exposed to longer than normal heat processing (e.g., baking) times in order to contain higher than normal acrylamide levels (i.e., approximately 700 ppb) with riboflavin and UV treatment. The control biscuits were heated at 110° C. for 10 minutes to simulate hot biscuits exiting a baking oven. The UV biscuits were heated at 110° C. for 10 minutes, then placed under UV light for 30 seconds per side. The UV+Ribo biscuits were heated at 110° C. for 10 minutes, then sprayed on each side with 1000 ppm riboflavin-5-phosphate in water, then placed under UV (365 nm) for 30-60 seconds per side. As shown below in Table 1 below, results of the analysis of the biscuits by liquid chromatography-mass spectrometry (LC/MS) showed a reduction of acrylamide content of 25-51% depending on the length of UV light exposure of the biscuits and the amount of riboflavin solution applied to the biscuits.

In particular, as can be seen in Table 1 below, in the first run, Control Biscuit A had 758 ng/g of acrylamide, UV Biscuit A had 691 ng/g of acrylamide and UV+Ribo Biscuit A had 591 ng/g of acrylamide (a reduction of approximately 22%). In the second run, Control Biscuit B had 731 ng/g of acrylamide and UV+Ribo Biscuit A had 361 ng/g of acrylamide (a reduction of approximately 51%). In the third run, Control Biscuit C had 760 ng/g of acrylamide, and UV+Ribo Biscuit A had 536 ng/g of acrylamide (a reduction of approximately 29%). On average, the Control Biscuits had approximately 750 ng/g acrylamide and the UV+Ribo Biscuits had approximately 496 ng/g acrylamide, which is a reduction of approximately 34%.

TABLE 1

Acrylamide Reduction Using UV Light And UV Light Plus Riboflavin

| Sample description | | Acrylamide ng/g | Average | Std Deviation |
| --- | --- | --- | --- | --- |
| Control A | Biscuit | 758 | | |
| Control B | Biscuit | 731 | 749.67 | 16.20 |
| Control C | Biscuit | 760 | | |
| UV-A | Biscuit | 691 | | |
| UV-B | Biscuit | 856 | 765.67 | 83.61 |
| UV-C | Biscuit | 750 | | |
| UV + Ribo-A | Biscuit | 591 | | |
| UV + Ribo-B | Biscuit | 361 | 496.00 | 120.10 |
| UV + Ribo-C | Biscuit | 536 | | |

Example 2

An experiment was carried out during the manufacture of Nabisco Ginger Snaps® to determine how riboflavin spray plus UV light irradiation affects heat-processed products that include heat-processed (and acrylamide-containing) ingredients (e.g., molasses and ginger raw materials). Samples of Ginger Snaps® containing approximately 360 ppb acrylamide were collected as manufactured, and after treatment with various concentrations of riboflavin spray and two different wavelengths of UV light. These samples were analyzed for acrylamide content by LC/MS.

Only a very small reduction in acrylamide content was seen in the treated samples (approximately 2.1% on average). Later, it was determined that the detectable acrylamide in the Ginger Snaps® was introduced via the molasses and ginger raw materials (which are heat-processed themselves), and thus the acrylamide was found not to be concentrated at the surface of the Ginger Snaps®. These results indicate that while spraying a riboflavin-containing solution followed by UV irradiation was very effective in removing acrylamide at the surface of biscuits which contain only acrylamide that is formed at their surface during heat processing, this treatment is not very effective at treating the bulk of the biscuits that include ingredients that are themselves heat-processed and include acrylamide therein.

Example 3

This experiment was carried out to test whether the UV treatment of heat-processed biscuits could cause an increase in oxidation rates in the biscuits and therefore reduce the usable shelf life of the biscuits. To that end, samples of Ginger Snaps® and belVita® were treated with riboflavin and UV light and placed in accelerated storage at 126° F. for one month (equivalent to six months of shelf storage at ambient temperature). After one month of accelerated storage, the samples were analyzed by gas chromatography (GC) for oxidative volatiles that are known markers for oxidative rancidity, namely, pentanal, hexanal, heptenal, heptanal, and octanal.

Figure 6:
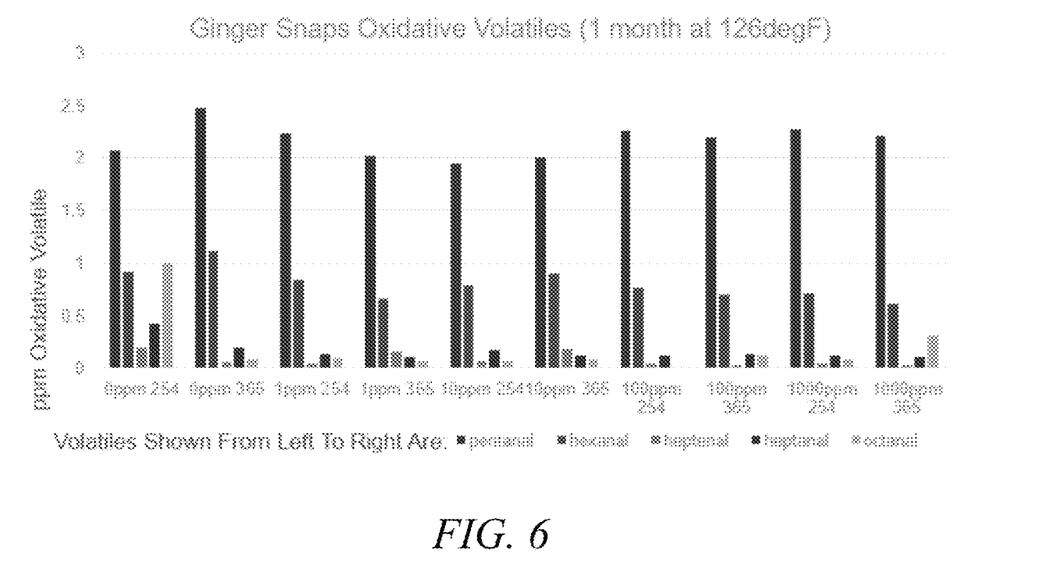
FIG. 6 is a chart representing oxidative volatile concentrations measured to be present in Ginger Snaps® following storage for 1 month at 126° F.
Figure 7:
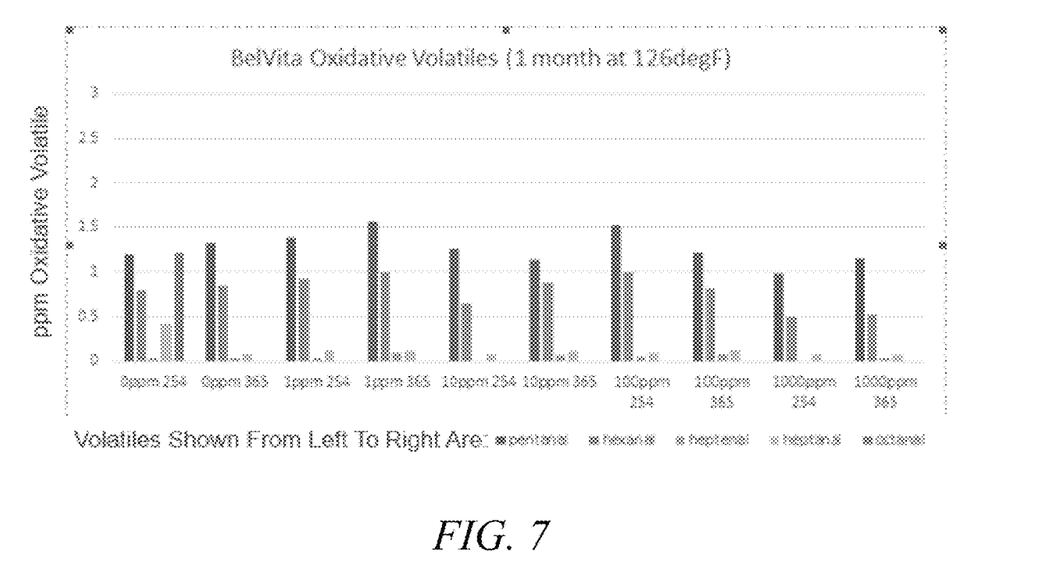
FIG. 7 is a chart representing oxidative volatile concentrations measured to be present in belVita® biscuits following storage for 1 month at 126° F.

As can be seen in FIG. 6, for Ginger Snaps®, the results indicate no increased oxidation in the biscuits when sprayed with a riboflavin solution in the range of 1 ppm to 1000 ppm, followed by UV light irradiation at both 254 nm and 365 nm. FIG. 6 shows that hexanal values detected in the Ginger Snaps® being just over 1 ppm or lower than 1 ppm, which is well below the industry-acceptable value of 10 ppm. Similarly FIG. 7 shows that the results indicate that treatment of belVita® biscuits with riboflavin spray at 1 ppm to 1000 ppm, followed by UV light at 254 nm and 365 nm does not cause increase oxidation in the biscuits. FIG. 7 shows that hexanal values detected in the belVita® biscuits were 1 ppm or lower, which is well below the industry acceptable value of 10 ppm.

Example 4

An experiment (which was run in triplicate) was carried out to compare the effects of various UV wavelengths alone and in combination with riboflavin pre-treatment in removing acrylamide from baked products that were prepared to have a normal acrylamide level (not the higher than normal acrylamide levels of above 700 ppb as used in Example 1). Solutions of various concentration were prepared by dissolving the appropriate amount of riboflavin-5'-phosphate sodium salt dihydrate (Alfa Aesar, Ward Hill, Mass., CAS #6184-17-4) in ultra-high purity water (18 Mohm resistivity) to achieve concentrations of 0, 1, 10, 100 and 1000 ppm riboflavin. Ultrasonication for 20 minutes was used to assist in dissolution of riboflavin in the water.

Two different UV/visible light lamps and sunlight were used to irradiate the riboflavin-solution-treated biscuits. The first lamp was a variable wavelength model with 254 nm, 302 nm, 365 nm bandpass settings (Model UVP 3UV, Analytik Jena US, Beverly, Mass.) and the second was a UV Grid Lamp with a removable 254 nm bandpass filter (Model R-52G, Analytik Jena US, Beverly, Mass.).

Output of both lamps at 254 nm (with the biscuits being at a distance of 2.5" from the lamps) and sunlight at 254 nm was measured with an Analytik Jena US UVX radiometer. Sunlight irradiation was the result of natural sunlight in Branchburg, N.J. from 9:30 am to 1:30 pm on a cloudless day in August of 2019. The results are shown Table 2 below:

TABLE 2

Emission of UV lamps and Sunlight

| Lamp ID | Emission 254 nm with Filter ($\mu W/cm^2$) | Emission 254 nm without Filter ($\mu W/cm^2$) |
| --- | --- | --- |
| UVP-3UV | 1709 | N/A |
| R-52G | 1709 | 4810 |
| Sunlight | N/A | 375 |

As can be seen in Table 2, the two UV lamps have very similar outputs with their filters in place. The R-52G lamp with the filter removed has a much higher output at 254 nm and provides the output of the complete Hg lamp spectrum of 200 nm to 600 nm, which subjects the samples to a higher level of UV and visible light at multiple wavelengths. Sunlight is seen to be much less intense than either of the UV lamps tested.

The belVita® biscuits (each biscuit weight 12.5 g) were treated by spraying each side of the biscuit with 2-3 sprays of riboflavin solution (equivalent to approximately 0.4-0.5 g of solution applied). The sprayed biscuits were immediately placed under the UV light source at a distance of 2.5" from the UV light source and irradiated for 60 seconds on each side. Experiments were carried out using the UVP-3UV lamp at 365 nm, the UVP-3UV lamp at 254 nm and the R-52G lamp with its filter removed (full Hg lamp spectrum).

Treated and control biscuits were analyzed for acrylamide content using the US FDA LC-MS method (United States Food and Drug Administration, Center for Food Safety and Applied Nutrition Office of Plant & Dairy Foods and Beverages, "Detection and Quantitation of Acrylamide in Foods," 2002). The results of the experiments are shown in FIG. 5.

Notably, the 0 ppm riboflavin solution in water still produced a small reduction in acrylamide content. This amount is consistent with the amount of weight gained by the biscuits from the water in the spray, and the error of the analytical method. Another set of biscuits was subjected only to UV light exposure at 365 nm, and showed no reduction in acrylamide content, illustrating that light exposure alone is not sufficient to reduce acrylamide content.

Statistical analysis of the replicate data from the experiments showed that a 20% reduction from control is statistically significant at the 95% confidence level. Statistically significant reductions in acrylamide content were achieved by treatments of 1 ppm-1000 ppm riboflavin at 254 nm and 365 nm, and at 100 ppm with the full Hg spectrum, with the 100 ppm riboflavin level identified as the optimum concentration tested at 254 nm and 1000 ppm riboflavin level identified as the optimum concentration tested at 365 nm. Only the 100 ppm riboflavin treatment was tested with the full spectrum lamp as it appeared to be the optimum concentration at 254 nm. In addition, 254 nm appears to be more effective than 365 nm, and using the full unfiltered Hg lamp spectrum appears to be more effective than either the 254 nm or the 365 nm filtered spectrum.

The results (see FIG. 5) of the acrylamide reduction analysis by LC/MS analysis showed a significant reduction of acrylamide, where at a riboflavin concentration of 100 ppm, the average acrylamide reduction percentage was 25% with 254 nm irradiation, and 18% with 365 nm irradiation. At riboflavin concentration of 1 ppm, the average acrylamide reduction percentage was 14% with 254 nm irradiation, and 11% with 365 nm irradiation. At riboflavin concentration of 10 ppm, the average acrylamide reduction percentage was 20% with 254 nm irradiation, and 16% with 365 nm irradiation. At riboflavin concentration of 1000 ppm, the average acrylamide reduction percentage was 13% with 254 nm irradiation and 19% with 365 nm irradiation.

Figure 8:
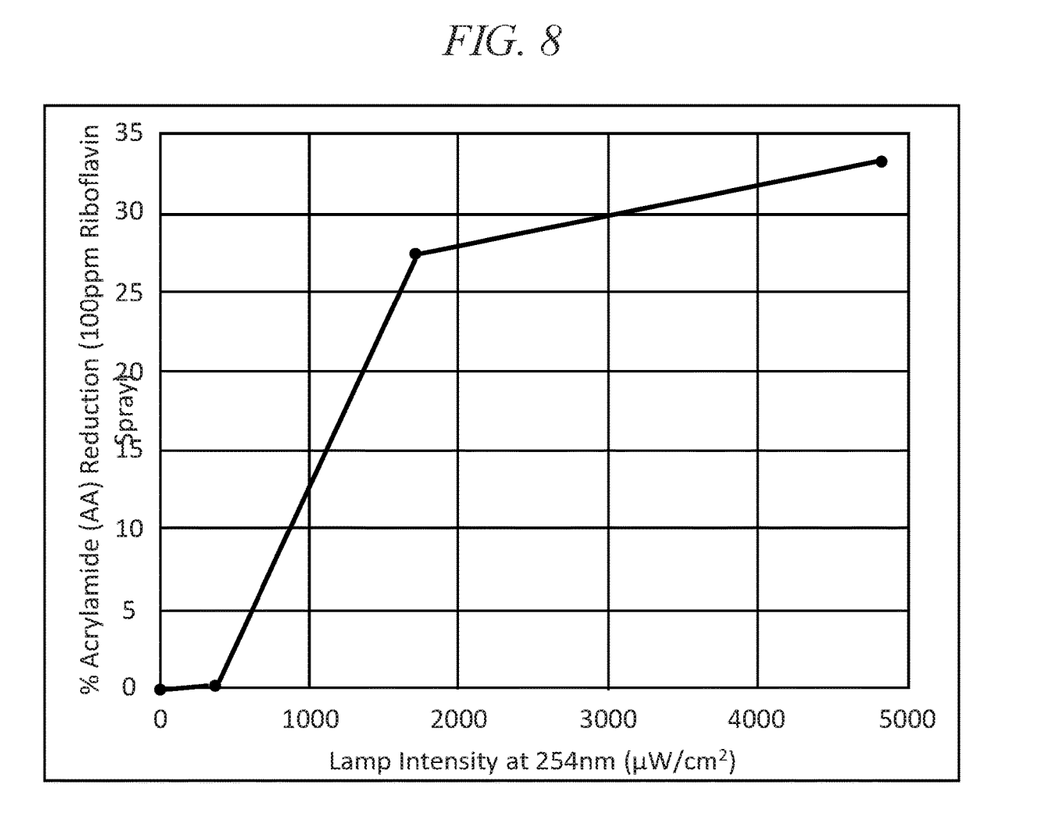
FIG. 8 is a chart representing percent acrylamide (AA) reduction resulting from 100 ppm riboflavin spray as a function of UV lamp intensity.

In addition, as shown graphically in FIG. 8, this experiment clearly showed that the total intensity of UV light delivered to the biscuits is also critical to the amount of acrylamide reduction achieved, with more intense UV light sources delivering greater reduction in acrylamide levels. Using more intense sources results in greater acrylamide reduction in a given exposure time, thus allowing the time needed for exposure to be shortened considerably versus a less intense source.

In some embodiments, LEDs with power densities approaching 3 $W/cm^2$ may be used. Without wishing to be limited by theory, such intense sources can considerably increase the effectiveness and reduce the treatment time for acrylamide reduction by the methods described above.

To illustrate the critical nature of the intense UV light source to acrylamide reduction, biscuits with either (1) no treatment, (2) a water spray and (3) a 100 ppm riboflavin in water spray were subjected to sunlight on a cloudless day in Branchburg, N.J. (corresponding to the UV emission in Table 2 above), for a period of 4 hours, two hours per side of the biscuits.

As can be seen in Table 3, below, no significant reduction in acrylamide was achieved for any of the three treatments that involve exposure of the biscuits to sunlight instead of an intense UV light lamp akin to those described above. In Table 3, negative results indicate acrylamide content higher than the control biscuits. In the case of the sunlight-only treatment, the higher than control acrylamide results may be due to drying of the biscuits in the sun resulting in a greater content of solids versus moisture and/or to generation of additional acrylamide by prolonged sunlight exposure.

TABLE 3

| Sample Description | Acrylamide (ppm) | % Reduction | Average % Reduction | Std Deviation |
|---|---|---|---|---|
| Control Composite of 5 Biscuits | 623 | | | |
| Ribo 100 ppm + Sunlight 1 | 636 | −2.09 | 0.26 | 4.68 |
| Ribo 100 ppm + Sunlight 2 | 626 | −0.48 | | |
| Ribo 100 ppm + Sunlight 3 | 625 | −0.32 | | |
| Ribo 100 ppm + Sunlight 4 | 648 | −4.01 | | |
| Ribo 100 ppm + Sunlight 5 | 572 | 8.19 | | |
| Water + Sunlight 1 | 636 | −2.09 | −3.69 | 5.36 |
| Water + Sunlight 2 | 633 | −1.61 | | |
| Water + Sunlight 3 | 681 | −9.31 | | |
| Water + Sunlight 4 | 602 | 3.37 | | |
| Water + Sunlight 5 | 678 | −8.83 | | |
| Sunlight Only 1 | 711 | −14.1 | −14.41 | 2.35 |
| Sunlight Only 2 | 714 | −14.6 | | |
| Sunlight Only 3 | 716 | −14.9 | | |
| Sunlight Only 4 | 691 | −10.9 | | |
| Sunlight Only 5 | 732 | −17.5 | | |

The evidence generated by the Examples above shows that treatment of heat-processed foods with a riboflavin spray followed by UV light exposure is an effective method of reducing acrylamide content. In addition, as Example 5 shows, in order to initiate monomer reactions of acrylamide and significantly reduce the acrylamide concentration in the biscuits/heat-processed product, after the heat-processed product is sprayed by a riboflavin-containing solution or after the riboflavin-containing solution is dissolved in a heat-processed product, the heat-processed product has to be irradiated by a UV light source having an intensity that is higher than sunlight. Taken as a whole, the methods and systems described herein advantageously provide for significant reduction in the levels of acrylamide in heat-processed foods, rendering the foods treated by the methods and systems described lower in levels of acrylamide present therein.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of treating an oven-baked product containing acrylamide to reduce a concentration of acrylamide present in the oven-baked product, the method comprising:
   baking ingredients of the oven-baked product in an oven to provide the oven-baked product;
   spraying a riboflavin solution containing from about 1 ppm to about 1000 ppm riboflavin onto at least a portion of an exterior surface of the oven-baked product; and
   initiating monomer reactions of acrylamide and thereby reducing the concentration of the acrylamide present in the oven-baked product by irradiating the riboflavin solution-sprayed oven-baked product with a UV light source that provides wavelengths between 200 nm and 400 nm at an intensity of from about 1000 $\mu W/cm^2$ to about 5000 $\mu W/cm^2$.

2. The method of claim 1, wherein the riboflavin solution is selected from riboflavin dissolved in water and riboflavin dissolved in a water and ethanol solution.

3. The method of claim 1, wherein the spraying of the riboflavin solution comprises spraying the riboflavin solution onto the at least a portion of the heat oven-baked product such that the riboflavin makes up about 1% to about 5% by weight of the oven-baked product.

4. The method of claim 1, further comprising irradiating the riboflavin solution-sprayed oven-baked product with the UV light source for about 1 second to about 45 seconds and reducing the concentration of the acrylamide present in the oven-based product by about 10% to about 50%.

5. The method of claim 1, further comprising drying the UV-irradiated oven-baked product in a dryer to reduce moisture levels therein.

6. The method of claim 1, wherein the riboflavin solution contains from about 1 ppm to about 100 ppm riboflavin.

* * * * *